United States Patent [19]

Uramoto

[11] E Patent Number: Re. 33,674

[45] Reissued Date of Patent: Aug. 27, 1991

[54] OPENABLE BAG

[75] Inventor: Tatsuro Uramoto, Tokyo, Japan

[73] Assignee: Minigrip, Inc., Orangeburg, N.Y.

[21] Appl. No.: 27,000

[22] Filed: Mar. 17, 1987 (Under 37 CFR 1.47)

Related U.S. Patent Documents

Reissue of:

[64] Patent No.: 3,780,781
Issued: Dec. 25, 1973
Appl. No.: 178,088
Filed: Sep. 7, 1971

U.S. Applications:

[63] Continuation-in-part of Ser. No. 882,491, Dec. 5, 1969, abandoned.

[51] Int. Cl.[5] ..... B65D 33/24

[52] U.S. Cl. ..... 206/620; 383/61; 206/610

[58] Field of Search ..... 383/63, 64, 65, 35; 206/610, 620, 605, 628

[56] References Cited

U.S. PATENT DOCUMENTS

| | | | |
|---|---|---|---|
| 2,665,834 | 1/1954 | Anglada | 206/605 |
| 3,198,228 | 8/1965 | Naito | 24/587 |
| 3,291,377 | 12/1966 | Eggen | 206/605 |
| 3,338,284 | 8/1967 | Ausnit | 383/65 |
| 3,371,696 | 3/1968 | Ausnit | 383/35 |
| 3,381,592 | 5/1968 | Ravel | 493/214 |
| 3,387,766 | 6/1968 | Kugler | 206/620 |
| 3,446,632 | 5/1969 | Le Van | 206/620 |
| 3,473,589 | 10/1969 | Gotz | 150/3 |
| 3,543,343 | 12/1970 | Staller et al. | 425/305.1 |
| 3,543,901 | 10/1970 | Repko et al. | 206/620 |
| 3,616,990 | 11/1971 | Powell | 206/620 |
| 3,619,395 | 11/1971 | Skendzic | 383/63 |
| 3,625,270 | 12/1971 | Skendzic | 383/63 |
| 3,633,642 | 1/1972 | Siegel | 383/64 |
| 3,652,006 | 3/1972 | Trewella | 206/620 |

*Primary Examiner*—Stephen P. Garbe
*Attorney, Agent, or Firm*—Kane, Dalsimer, Sullivan, Kurucz, Levy, Eisele and Richard

[57] ABSTRACT

A plastic film structure for forming a bag including a sheet of thin plastic film with continuous shaped interlocking rib and groove profiles thereon either integral with the film or on strips which are fused to the film with the sheet having plastic reinforcing strips thereon between the profiles with the reinforcing strips providing tear guidelines for tearing off the top of a bag formed from the sheet to thereafter provide gripping flanges for separating the profiles and opening the bag.

12 Claims, 2 Drawing Sheets

OPENABLE BAG

Matter enclosed in heavy brackets [ ] appears in the original patent but forms no part of this reissue specification; matter printed in italics indicates the additions made by reissue.

REFERENCE TO RELATED APPLICATIONS

The present application is a continuation-in-part of my copending application Ser. No. 882,491 filed Dec. 5, 1969 and now abandoned.

BACKGROUND OF THE INVENTION

The present invention relates to improvements in plastic film sheet structures for forming bags and the bags formed therefrom, particularly to a structure which permits the bag to be more readily opened.

More specifically, the invention relates to bags of the reopenable type which have shaped rib and groove profiles extending along the top that are openable by pulling apart top flanges above the profiles and are reclosable by pressing the rib and groove elements together. This type of bag is very useful for products which are removed from the bags only a portion at a time, or where the bags are to be reused. However, in many instances it is desirable to provide a bag which is sealed in the store and cannot be opened until eventually purchased. The advantages of this type of bag are obvious for foodstuffs and like materials wherein the potential customers must not be able to open the bag to remove a portion of the contents or contaminate the interior.

It is accordingly an object of the present invention to provide an improved sheet structure for forming a bag of the reclosable type wherein the bag has a structure which is completely sealed until used.

In the sealed reopenable type of bag, it is conventional to tear open the top of the bag above the reclosable rib and groove elements in such a manner as to provide flanges with which to separate the elements. This may be done by having the side walls of the bag either continuous or sealed at the top so that the top can be either cut or torn above the rib and groove elements along a line of weakened resistance or perforation before it is to be opened. The flanges which remain at the top of the bag after it is torn or cut enable the user to pull the rib and groove elements apart for access to the bag interior.

It is an object of the invention to provide a reclosable bag of the seated type with an improved tearing strip arrangement at the top which permits the bag to be made of very thin lightweight material or a laminated material. A feature of the present invention is to provide a bag structure wherein a tear line, where the film is too thin to be scored or perforated is required, or where because the film is of laminated construction and has sub-stantially greater strength, additional tearability or tear guidance is required, or wherein the functions of the interlocking rib and groove elements are not encumbered because of the thinness of the material, so that the provision of an easy to remove, yet strong tear strip at the top of the bag is permitted.

Various modifications, forms and arrangements of the invention are intended to be embodied and will become apparent to those skilled in the art from the teaching of the principles of the invention in connection with the disclosure of the claims, specification and drawings, in which:

IN THE DRAWINGS

Figure 3:
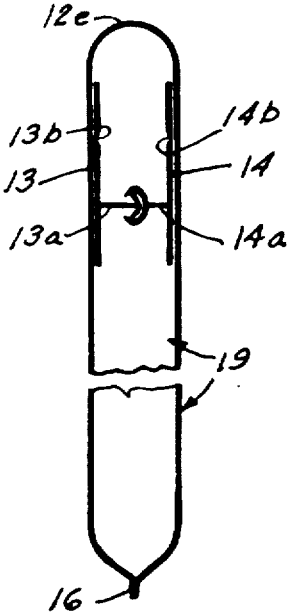
FIG. 3 is a vertical sectional view taken substantially along the line III—III of FIG. 2.
Figure 10:
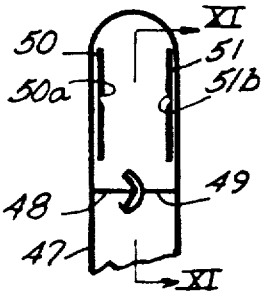
Figure 11:
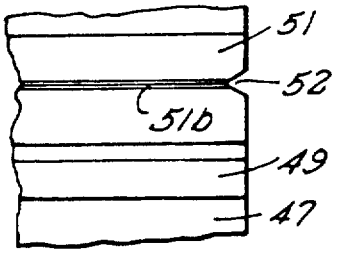
Figure 12:
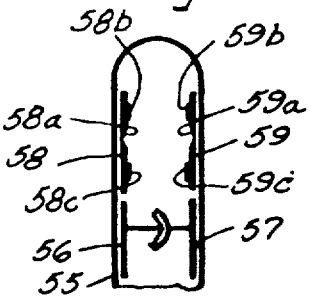
Figure 13:
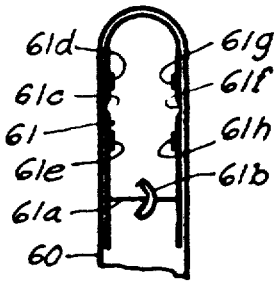
Figure 14:
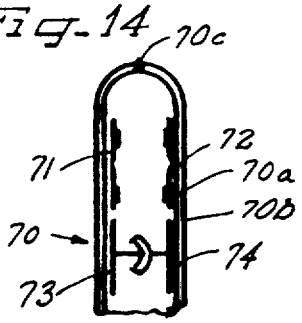

FIGS. 5 thru 10 are vertical sectional views similar to FIG. 3 illustrating different arrangements embodying the concepts of the invention;

FIG. 11 is a fragmentary sectional view taken substantially along line XI—XI of FIG. 10; and FIG. 12 thru 14 are vertical sectional views illustrating additional arrangements embodying the concepts of the invention.

DESCRIPTION OF THE PREFERRED EMBODIMENTS

Figure 1:
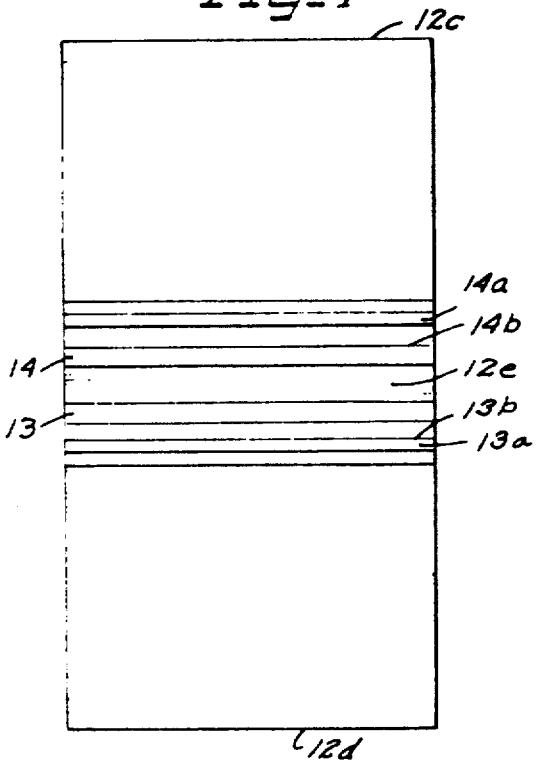
FIG. 1 is a plan view of a plastic film sheet structure for forming a bag in accordance with the principles of the present invention.
Figure 2:
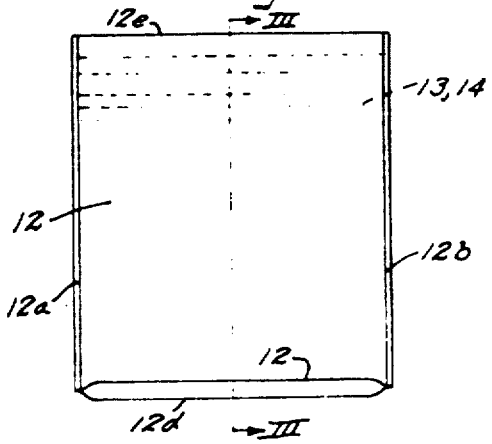
FIG. 2 is an elevational view of a bag formed from the sheet structure of FIG. 1.
Figure 4:
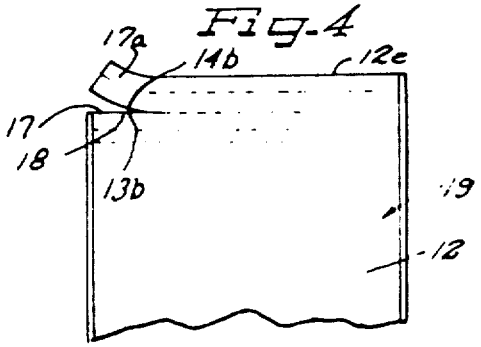
FIG. 4 is a fragmentary view shown in perspective illustrating a tear strip being removed from the top of a bag.

FIG. 1 shows a thin plastic film sheet of polyethylene or similar plastic material of the type used in thin bags. The sheet has side edges 12c and 12d which will later form the bottom of a bag 19 as shown in FIG. 2. The sheet has front and rear edges 12a and 12b which will later form the side edges of the bag 19 of FIG. 2. The sheet is preformed such as by a plastic extrusion process, and will usually be formed in a continuous running strip and cut into sections as shown in FIG. 1. When formed into a bag, the sheet is doubled or folded down its center 12e to form the top of the bag as shown in FIGS. 2 and 4. When doubled, seams will be formed to join the doubled edges 12a and 12b to provide side seams for the bag. When a series of bags are made from a continuous running sheet, the seaming and cutting can be formed in a simultaneous operation such as by a hot wire cutter and seamer as will be recognized by those versed in the art.

Fused to the upper surface of the sheet (which will form the interior of the bag after the sheet is folded and side sealed) are a pair of plastic reinforcing strips 13 and 14. These reinforcing strips carry the interlocking rib and groove elements with the rib element shown at 13a and the groove element at 14a. These elements are complementary shaped so as to interlock when pressed together and to separate when forcibly pulled apart. It should be noted that said reinforcing strips can initially be formed as one piece.

The reinforcing strips 13 and 14 also function to define a tear line for removing a strip 17a from the top of the bag in the manner shown in FIG. 4. The tear line is formed by lines 13b and 14b of weakened resistance so that when the top of the bag 19 is gripped and pulled to the side or upwardly, as shown in FIG. 4, the strip 17a will be torn from the bag in a relatively straight line along the tear lines 13b and 14b. This will leave flanges 17 and 18 which can be gripped and pulled apart to forcibly separate the rib and groove elements 13a and 14a. The remaining part of the reinforcing strips also strengthen and stiffen the film flanges above the profile. If too thin a film is being used from which to make the bags, the opening flanges above the profile would bend at the point the profile stem joins the film and would not separate the profile.

In summary with respect to the sheet structure of FIG. 1, when it is to be formed into the bag 19 of FIG. 2, it is doubled down its center 12e to form a fold for the top of the bag, and the sides 12a and 12b are seamed with the bottom edges 12c and 12d remaining unattached to leave a bottom opening for filling the bag. The rib and groove elements 13a and 14a are pressed together to interlock so that the contents of the bag will not flow past these interlocked elements. When the contents are placed in the bag, a seam is formed along the bottom to join edges 12c and 12d to form a seam 16 as shown in FIG. 3. The bag is then completed for shipping and storage. It is completely hermetically sealed preventing moisture and foreign elements from coming into contact with the contents or coming into the top to contact the rib and groove elements. When the bag is to be used, the user grips the top to tear the strip 17 therefrom in the manner shown in FIG. 4. The weakened tear lines 13b and 14b insure that a strip of uniform width will be torn from the top leaving flanges 17 and 18 intact. This prevents the tear from turning downwardly to tear into the profiles or from turning upwardly so that only a portion of the top is removed. Thus, the plastic sheet 12 for the bag can be chosen from material that is transparent, flexible and has all the properties desirable in a barrier film. The materials can also be chosen of minimum weight to effect a saving in cost of material and yet, at the top of the bag the light weight of the bag material does not hamper the function of the interlocking elements or does not hamper the capability of removing a tear strip for access to the interlocking rib and groove elements.

In some instances it may be desired to provide a flat reinforcing tear strip separate from the strips which support the rib and groove elements, as shown in the structures of FIGS. 5 thru 9.

Figure 5:
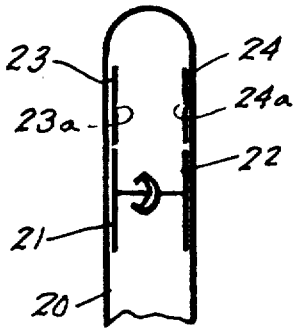

In FIG. 5 a bag body 20 is formed of plastic film and has fused to the inner surface, profile strips 21 and 22 carrying shaped complementary interlocking rib and groove profiles. Also fused to the inner surface of the sheet material of the bag are reinforcing strips 23 and 24 which have tear lines of weakened resistance 23a and 24a extending down their center. Thus, when the bag is opened, the top can be torn and the bag will readily separate along lines 23a and 24a. If the plastic film is relatively light in weight, this will enhance the removal of the top strip.

It may be desired to form the profile strips 21 and 22, and the reinforcing tear strips 23 and 24 of different materials. The profile strips 21 and 22 will be of a stiff plastic having characteristics necessary for optimum performance of the interlocking rib and groove profiles, the reinforcing strips 23 and 24 will be of a tough material which resists lateral tearing and encourages the tearing of the strips down through the center tearlines 23a and 24a. The plastic of the reinforcing tear strips may be only sufficiently thick to guide the tear for obtaining economy in production. A plastic which has an oriented grain so that it tears more easily in a longitudinal direction is particularly well suited for this function.

When the tear strip is removed from the bag, in the manner shown in FIG. 4, the lower portions of the reinforcing strip which remain, i.e., in FIG. 5 the portions below the lines 23a and 24a, provide reinforced gripping flanges. These remaining portions of the strips reinforce the lips to aid the user in pulling apart the interlocking rib and groove elements.

Figure 7:
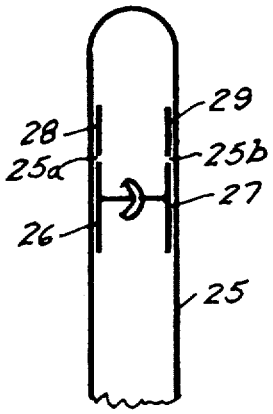

In another form, as shown in FIG. 7, the reinforcing film strips 28 and 29 are constructed so that the bag must tear between the strips 28 and 29 and the profile strips 26 and 27. The strips are fused to the inside wall of the bag 25, and when the top is torn from the bag the tear will follow along the lines 25a and 25b of the bag material itself.

In most instances it will be apparent to the user where to grip the bag for tearing the strip from the top, but index markings or color lines may be added to the plastic material to illustrate where the tear is to be begun. Also, the strips such as 28 and 29 may be colored so as to show up through the transparent bag to indicate to the user where to grip. In addition an end notch may be provided such as shown at 52 in FIG. 11 as will be later described herein.

Figure 8:
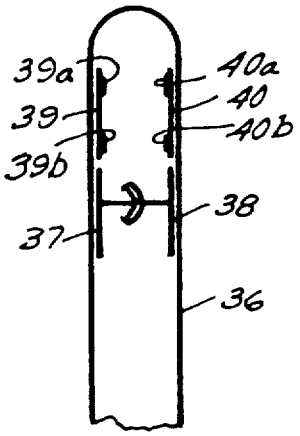

In the form illustrated in FIG. 8, reinforcing ribs are provided in the reinforcing tear strip so as to guide the tear along said ribs. In the bag 36 of FIG. 8, profile strips 37 and 38 are fused to the inner surface. Reinforcing tear strips 39 and 40 are also fused to the inner surface of the bag, above the profile strips. These reinforcing strips 39 and 40 each have parallel ribs extending along the surface such as shown at 39a and 39b for the strip 39, and at 40a and 40b for the strip 40. The ribs are positioned so as to be in alignment or immediately adjacent with each other in the collapsed bag so that when the user grips the top of the bag, the strips 39 and 40 will tear down the center between the ribs. The ribs will prevent the line of tear from deviating sideways.

Figure 6:
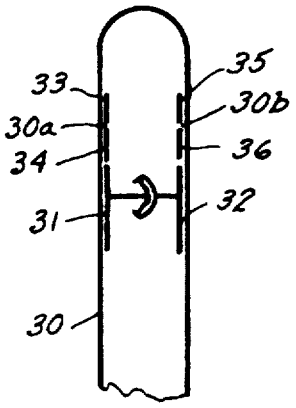

In the arrangement of FIG. 6, separate parallel reinforcing strips are provided to compel the line of tear to travel between the strips. In the bag 30, profile strips 31 and 32 are attached to the inner surface. Above the profile strips of one side wall of the bag are the reinforcing tear strips 33 and 34 and on the other side, opposite them, are reinforcing tear strips 35 and 36. These strips are in alignment so that the tear lines 30a and 30b are opposite each other. When a user grips the top of the bag, the top portion including the strips 33 and 35 will be removed from the bag top.

Figure 9:
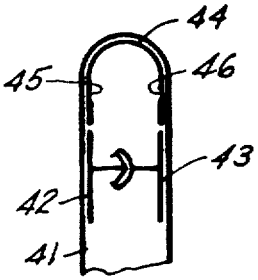

In the structure of FIG. 9, the reinforcing tear strip 44 is formed as a single strip. In this bag 41, rib and groove profile strips 42 and 43 are fused to the inner surface of the bag wall. The reinforcing tear strip 44 is fused to the film above the profile strips and has tear lines 45 and 46 of weakened tear resistance positioned to be opposite each other so that the top portion of the bag will be smoothly removed when it is gripped and torn.

FIG. 10 illustrates an arrangement wherein the profiles 48 and 49 are formed integral with the wall of a bag 47. Tear strips 50 and 51 are fused to the inner surface of the bag above the profiles and have tear lines 50a and 51b. It will be understood that with each of the arrangements shown in FIGS. 7 thru 9, the profiles may be integral with the bag wall rather than being carried on strips attached to the bag wall. The provision of strips carrying the profiles permits the bag wall to be of thinner material.

In the arrangement of FIG. 10, an end notch 52 may be provided as shown in FIG. 11. This end notch provides a starting point to help insure that the tear will begin at the correct location. It will be understood that the starting notch 52 may be utilized with each of the structures shown in the drawings. The notch is preferably formed by providing a small indentation or cut in the plastic material and then sealing around the edges of the cut to reatin the moisture and dust-proof integrity of the bag, or by making a broad fin type seal and then cutting a notch into it.

In FIG. 12 a bag 55 has profile strips 56 and 57 fused to the inner surface thereof. These profile strips have mating interlocking rib and groove elements similar to the strips earlier described herein. Above the profile strips are positioned reinforcing strips 58 and 59, which are fused to the material of the bag 55. The reinforcing strip 58 has a tear line 58a extending therealong, and the strip 59 has a tear line 59a which is positioned to coincide with the tear line 58a. Thus, when the top is torn off the bag, the two tear lines 58a and 59a, being opposite each other, will permit removal of a strip to release the flanges for separating the rib and groove elements. To aid in guiding the tearing of the bag along the tear lines, guiding ribs are positioned above and below the tear lines. The strip 58a has ribs 58b and 58c. The strip 59 has ribs 59b and 59c. These ribs confine the direction of tear to a straight line along the top, i.e., along the tear lines 58a and 59a.

In the arrangement of FIG. 13, a one-piece strip 61 is positioned within a bag 60. This strip 61 carries the interlocking profiles 61a and 61b as well as the tear lines 61c and 61f. The tear lines are opposite each other for permitting tearing off a strip from the top of the bag. To guide the tear of the material along the tear lines, ribs are positioned above and below the tear lines. Ribs 61d and 61e are positioned on each side of the tear line 61c, and ribs 61g and 61h are positioned on each side of the tear line 61f. When the top strip is torn off, the ribs 61e and 61h will remain with the bag and provide additional gripping surfaces for grasping the flanges and pulling them apart to separate the rib and groove elements 61a and 61b.

In FIG. 14 a bag 70 is formed of plural layers 70a and 70b of material. 70a, for example, may be thermoplastic bonded to an outer layer 70b of paper or foil and various numbers and types of layers may be employed which provide the physical properties required by a bag for a particular use. Bonded to the inner layer of the bag are rib and groove profile strips 73 and 74. Above the profile strips are reinforcing strips 71 and 72 which are bonded to the inner layer of the bag and have tear guide ribs, or other tear guide means thereon.

The bag 70 is shown closed at the top with a seam 70c. It will be understood that various forms of profile strips and reinforcing strips shown and described with the other figures may be employed with a multilayer bag, such as shown in FIG. 14, and the bags may be seamed at the top for certain purposes, rather than being continuous at the top. With the arrangement of FIG. 14, the separate layers of the bag may each be of a material optimumly suited to perform the function of giving the bag wall stiffness, impermeability, transparency or opacity, or whatever physical property that is required, and yet, the profile strips may be formed of a plastic of optimum physical properties for the interlocking rib and groove elements. Further, the reinforcing strips may also be formed of a plastic or other material which has optimum properties for functioning as a tear guide, stiffener and flange strengthening means. Thus, by making the bag of multiple components, a substantial saving can be effected while actually enhancing the properties of the bag and its parts.

The profile strips and the tear strips of the various embodiments are fused to the sheet material by a suitable fusing process. The continuous sheet material and strips will conventionally be provided from rolls with the strips being fused to the preprepared sheet material. The strips may be fused immediately after they are extruded, as described in the above copending applications, or may be preformed and fused by the application of heat and pressure at a later time. The sheet with the strips fused thereto then may be wound upon a roll or in some instances, it may be desirable to form the bag immediately by doubling over the sheet and forming the bag as illustrated in FIG. 2.

While a bag is shown that has the top formed of continuous film doubled over, in some instances separate sheets may be formed with a seam formed at the very top of the bag above the reinforcing tear strips. It will be understood that in the claims wherein reference is made to a plastic film structure for forming a bag, the intent is to cover the film structure in its condition in a sheet as shown in FIG. 1 before being formed into a bag as well as after the film structure is embodied in a bag in the condition shown in FIGS. 2 and 3, for example.

The bag material will preferably be transparent, though not necessarily when made from barrier films, and in some instances, the tear strips may be colored so that the user can readily see where the tear is to be made. In the arrangement of FIG. 8, for example, the material of the bag 36 may be transparent and the strips 39 and 40 may also be transparent with the ribs 39a and 39b and the ribs 40a and 40b being colored, or in FIG. 6 the strips 33 and 35 could be colored.

In the arrangement of FIG. 8, while the strips 39 and 40 may be uniformly fused to the film, and the center portions of the strips 39 and 40 between the ribs may be sealed by a cross-weave pattern.

While the reinforcing tear strips are shown in the drawings as fused to the inner surface of the film sheet material of the bag, in some instances it may be desired to laminate them to the outer surface.

I claim as my invention:

1. A bag structure comprising, a bag body formed of a thin plastic film, said film being continuous at the bag top, facing mating interlocking profiles extending within the bag spaced downwardly from [the] *a* top edge of the bag, a flat reinforcing strip means of plastic fused to the bag film along the top between the top edge and said profiles defining a top tear line spaced above said profiles.

2. A bag in accordance with claim 1 wherein said bag body has an opening at the bottom for filling and sealing the bag.

3. A bag in accordance with claim 1 wherein said profiles are carried by strips fused to the inner surface of the film of the bag body.

4. A bag structure constructed in accordance with claim 1 wherein the bag body has a seal along the top above said reinforcing strip means.

5. A bag structure comprising, a bag body formed of a flexible plastic film and having side walls, interlocking rib and groove elements on the inner surfaces of the side walls adjacent the top of the bag, flanges projecting above the rib and groove elements for gripping the bag and drawing the elements apart, and strips fused to the surfaces of the flanges above the elements for stiffening the flanges and providing improved gripping thereof.

6. A reclosable bag comprising, a plastic film bag body being continuous at the top and closed by seals at the sides and bottom, and fastener strips fused to the inner surface of the bag adjacent the top with said strips having interlocking profiles on the inner face and a flat surface on the outer face with the flat surface being joined to the film, with said [strip] *strips* containing means for tearing open the top of the bag above the profiles along a line of weakened tear resistance.

7. A reclosable bag structure comprising in combination, a bag body including opposing bag walls of a flexible material, opposed separate plastic fastener strips on the inner walls of the bag adjacent *to but spaced from* the bag top having mating pressure interlocking separable rib and groove *profile* elements projecting toward each other and having a base with a flat surface extending above and below the [profiles] *profile elements* with said base being joined to the inner surface of the bag wall [,] *reinforcing said bag wall along a section at said flat surface, whereby to define a zone of weakened tear resistance between the bag top and said reinforced bag wall section* and the upper ends of the bag walls being joined to each other at the top of the bag to protect the bag contents above the fastener strips.

8. A reclosable bag structure constructed in accordance with claim 7 wherein said bag walls have an inner surface of plastic and are joined to the flat plastic base of the fastener strips by being fused thereto above and below said rib and groove elements.

9. A reclosable bag structure constructed in accordance with claim 7 wherein the side edges of the bag are joined by cross seals and the lower edges are joined by a bottom seal so that the bag provides a complete barrier protecting the bag contents from both above and below said fastener strips.

10. A reclosable bag structure constructed in accordance with claim 7 wherein the upper ends of the walls are joined by being continuous and integral with the material of the two walls folded at the extreme top of the bag.

11. A reclosable bag structure constructed in accordance with claim 7 wherein the opposing bag walls are of one piece and continuous at the top of the bag.

12. A reclosable bag structure constructed in accordance with claim 7 wherein the bag walls are joined at the bottom edge of the bag and are of one piece.

* * * * *